(12) United States Patent
Rodoni (10) Patent No.: US 10,210,623 B2
(45) Date of Patent: *Feb. 19, 2019

(54) WASTE MANAGEMENT SYSTEM IMPLEMENTING REMOTE AUDITING

(71) Applicant: Rubicon Global Holdings, LLC, Atlanta, GA (US)

(72) Inventor: Philip Rodoni, Decatur, GA (US)

(73) Assignee: RUBICON GLOBAL HOLDINGS, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/675,392

(22) Filed: Aug. 11, 2017

(65) Prior Publication Data

US 2017/0345169 A1    Nov. 30, 2017

Related U.S. Application Data

(63) Continuation of application No. 15/206,469, filed on Jul. 11, 2016, now Pat. No. 9,754,382.

(60) Provisional application No. 62/297,839, filed on Feb. 20, 2016.

(51) Int. Cl.
| | | |
|---|---|---|
| *G06K 9/00* | (2006.01) | |
| *G06T 7/40* | (2017.01) | |
| *G06Q 10/00* | (2012.01) | |
| *G06T 7/90* | (2017.01) | |
| *B65F 3/00* | (2006.01) | |
| *B65F 3/04* | (2006.01) | |
| *H04N 5/232* | (2006.01) | |

(52) U.S. Cl.
CPC ............... *G06T 7/40* (2013.01); *B65F 3/001* (2013.01); *B65F 3/041* (2013.01); *G06K 9/00624* (2013.01); *G06Q 10/30* (2013.01); *G06T 7/90* (2017.01); *H04N 5/23293* (2013.01); *B65F 2210/128* (2013.01); *B65F 2210/138* (2013.01); *G06T 2207/10024* (2013.01); *Y02W 90/20* (2015.05)

(58) Field of Classification Search
CPC combination set(s) only.
See application file for complete search history.

(56) References Cited

U.S. PATENT DOCUMENTS

| | | |
|---|---|---|
| 4,773,027 A | 9/1988 | Neumann |
| 4,868,796 A | 9/1989 | Ahrens et al. |
| 5,014,206 A | 5/1991 | Scribner et al. |
| 5,031,796 A | 7/1991 | Schafer et al. |
| 5,214,594 A | 5/1993 | Tyler et al. |
| 5,326,939 A | 7/1994 | Schafer |
| 5,360,132 A | 11/1994 | Edelhoff |

(Continued)

OTHER PUBLICATIONS

Extended European Search Report dated Jun. 1, 2017, 8 pages.

*Primary Examiner* — Anand Bhatnagar
(74) *Attorney, Agent, or Firm* — Rock IP, PLLC (57) ABSTRACT

A system is disclosed for auditing waste retrieved by a service vehicle. The system may have an optical sensor mountable onboard the service vehicle and configured to capture image data associated with the waste as the waste falls into the service vehicle during completion of a waste service activity. The system may also have at least one controller in communication with the optical sensor and being configured to generate at least one of an alert and a recommendation regarding a mix of the waste based on the image data.

20 Claims, 3 Drawing Sheets

(56) References Cited

U.S. PATENT DOCUMENTS

| | | |
|---|---|---|
| 5,375,860 A | 12/1994 | Emsberger et al. |
| 5,450,317 A | 9/1995 | Lu et al. |
| 5,467,268 A | 11/1995 | Sisley et al. |
| 5,489,898 A | 2/1996 | Shigekusa et al. |
| 5,527,147 A | 6/1996 | Hulls |
| 5,532,928 A | 7/1996 | Stanczyk et al. |
| 5,592,375 A | 1/1997 | Salmon et al. |
| 5,596,502 A | 1/1997 | Koski et al. |
| 5,664,112 A | 9/1997 | Sturgeon et al. |
| 5,699,525 A | 12/1997 | Embutsu et al. |
| 5,715,398 A | 2/1998 | Lubenow et al. |
| 5,742,931 A | 4/1998 | Spiegelhoff et al. |
| 5,765,138 A | 6/1998 | Aycock et al. |
| 5,837,945 A | 11/1998 | Cornwell et al. |
| 5,953,504 A | 9/1999 | Sokal et al. |
| 6,052,122 A | 4/2000 | Sutcliffe et al. |
| 6,097,995 A | 8/2000 | Tipton et al. |
| 6,124,810 A | 9/2000 | Segal et al. |
| 6,199,702 B1 | 3/2001 | Buer |
| 6,216,108 B1 | 4/2001 | LeVander |
| 6,256,640 B1 | 7/2001 | Smalley et al. |
| 6,360,186 B1 | 3/2002 | Durbin |
| 6,425,487 B1 * | 7/2002 | Emmott .............. B07C 7/00 209/583 |
| 6,669,832 B1 | 12/2003 | Saito et al. |
| 6,907,432 B1 | 6/2005 | Szmanda et al. |
| 6,915,268 B2 | 7/2005 | Riggs et al. |
| 7,092,960 B2 | 8/2006 | Ohishi et al. |
| 7,818,284 B1 | 10/2010 | Walker et al. |
| 8,170,886 B2 | 5/2012 | Luff |
| 8,322,639 B2 * | 12/2012 | Gitschel ............ B02C 23/08 241/19 |
| 8,550,252 B2 | 10/2013 | Borowski et al. |
| 8,630,773 B2 * | 1/2014 | Lee ................. G08B 13/196 348/143 |
| 8,674,243 B2 * | 3/2014 | Curotto ............. G06Q 10/30 177/136 |
| 9,098,884 B2 * | 8/2015 | Borowski ............ B65F 1/0066 |
| 9,342,884 B2 | 5/2016 | Mask |
| 9,403,278 B1 * | 8/2016 | Van Kampen ......... B25J 9/1697 |
| 2001/0049583 A1 | 12/2001 | Bumstein et al. |
| 2002/0049622 A1 | 4/2002 | Lettich et al. |
| 2002/0069137 A1 | 6/2002 | Hiroshige et al. |
| 2002/0077875 A1 | 6/2002 | Nadir |
| 2002/0123914 A1 | 9/2002 | Kane et al. |
| 2002/0143596 A1 | 10/2002 | Carmody |
| 2003/0003568 A1 | 1/2003 | Yilmaz |
| 2003/0069745 A1 * | 4/2003 | Zenko ................. B09B 5/00 705/308 |
| 2004/0024712 A1 | 2/2004 | Saito et al. |
| 2007/0219862 A1 * | 9/2007 | Casella ............. B65F 1/1484 705/14.11 |
| 2008/0061977 A1 * | 3/2008 | Maruca ............. B65F 1/1484 340/572.1 |
| 2009/0169348 A1 | 7/2009 | Maruca et al. |
| 2010/0082499 A1 | 4/2010 | Luff |
| 2011/0279227 A1 | 11/2011 | Maruca et al. |
| 2012/0179477 A1 | 7/2012 | Luff |
| 2013/0151083 A1 * | 6/2013 | Lee ................. G08B 13/196 701/45 |
| 2014/0379588 A1 * | 12/2014 | Gates ............... G06Q 10/0631 705/308 |
| 2015/0084777 A1 | 3/2015 | Haber |
| 2015/0324760 A1 * | 11/2015 | Borowski ............ B65F 1/0006 705/308 |
| 2016/0001297 A1 | 1/2016 | Qiu |
| 2016/0187188 A1 * | 6/2016 | Curotto ............. G06Q 10/30 177/136 |
| 2017/0109704 A1 * | 4/2017 | Lettieri ............ G06Q 10/1093 |

* cited by examiner

WASTE MANAGEMENT SYSTEM IMPLEMENTING REMOTE AUDITING

RELATED APPLICATIONS

This application is a continuation of U.S. application Ser. No. 15/206,469 filed on Jul. 11, 2016, which claims priority to U.S. Provisional Application No. 62/297,839 filed on Feb. 20, 2016.

TECHNICAL FIELD

The present disclosure relates generally to a waste management system and, more particularly, to a waste management system implementing remote auditing of collected waste.

BACKGROUND

Commercial and residential waste service providers perform periodic waste audits as an added benefit for particular customers. The waste audit is an analysis of the customer's waste that is removed from a particular location on a periodic basis. The analysis may indicate the different types of materials in the customer's waste. For example, the analysis may indicate an amount (e.g., percent, weight, volume, etc.) of the waste that is recyclable. In some instances, the analysis may also provide a value of the recyclable waste and/or a recommendation for reducing, reusing, and/or selling portions of the waste in order for the customer to recoup a portion of the waste service cost.

Historically, a waste service audit was performed manually on a rather limited basis. In particular, a waste service representative (and/or the customer) would observe the waste being dumped from a receptacle into a service vehicle and/or sift through waste inside the receptacle. The representative would then record information about the observed waste. For example, as a dumpster was lifted by a service vehicle and dumped into a bed of the vehicle, the representative would be on site to see the falling waste materials and record the materials as being cardboard, plastic, glass, biodegradable, or other. An analysis would then be performed based on the observations, and corresponding recommendations regarding recycling would be made.

Although acceptable for some applications, the manual on-site waste service audits may be less than optimal. In particular, these waste service audits can be difficult, time-consuming, inaccurate, and potentially hazardous to the waste service representative. In addition, because of the difficulty and amount of time required for the manual on-site waste audits, the waste audits may not be completed frequently. As a result, the accuracy of the analysis and/or the benefit of the recommendation may be lower than desired for some applications.

The disclosed system is directed to overcoming one or more of the problems set forth above and/or other problems of the prior art.

SUMMARY

In one aspect, the present disclosure is directed to a system for auditing waste retrieved by a service vehicle. The system may include an optical sensor configured to capture image data associated with the waste as the waste falls into the service vehicle during completion of a waste service activity. The system may also include at least one controller in communication with the optical sensor and being configured to generate at least one of an alert and a recommendation regarding a mix of the waste based on the image data.

In another aspect, the present disclosure is directed to a method for performing an audit of waste retrieved by a service vehicle. The method may include capturing image data of the waste as the waste falls into the service vehicle during completion of a waste service activity, and generating at least one of an alert and a recommendation regarding a mix of the waste based on the image data.

In yet another aspect, the present disclosure is directed to a non-transitory computer readable medium containing computer-executable programming instructions for performing an audit of waste retrieved by a service vehicle. The method may include capturing image data of the waste as the waste falls into the service vehicle during completion of a waste service activity, and generating at least one of an alert and a recommendation regarding a mix of the waste based on the image data.

DETAILED DESCRIPTION

Figure 1:
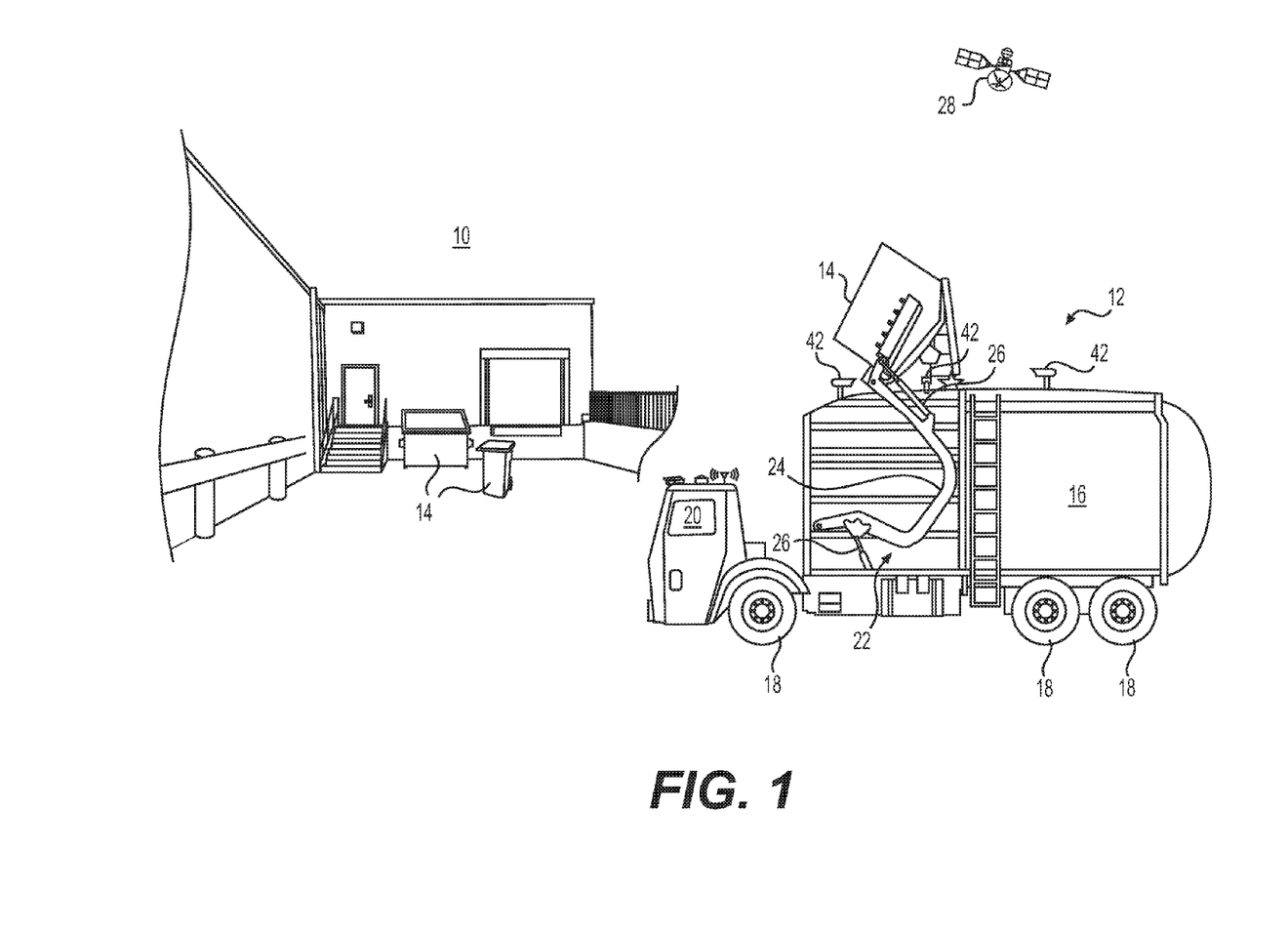
FIG. 1 is an isometric illustration of an exemplary disclosed waste management environment.

FIG. 1 illustrates an exemplary waste management environment ("environment") 10, at which one or more service vehicles 12 are providing waste services. Environment 10 may include a retail store, a factory, a government building, a residential address, or another location having one or more receptacles 14 that require the service of service vehicle 12. The service may include, for example, the retrieval of waste materials from inside of receptacle(s) 14, the replacement of receptacle(s) 14, and/or the placement of new or additional receptacles 14.

Service vehicle 12 may take many different forms. In the example shown in FIG. 1, service vehicle 12 is a hydraulically actuated, front-loading type of service vehicle. Specifically, service vehicle 12 may include a bed 16 supported by a plurality of wheels 18, a cab 20 located forward of bed 16, and a lifting device 22 pivotal over a top of cab 20. Lifting device 22 may consist of, among other things, one or more lift arms 24 configured to engage and/or grasp receptacle 14, and one or more actuators 26 powered by pressurized oil to raise and/or tilt lift arms 24 (and receptacle 14) up past cab 20 to a dump location over bed 16. After dumping of receptacle 14, pressurized oil may be released from hydraulic actuator(s) 26 to allow lowering of lift arms 24 and receptacle 14 back to the ground in front of service vehicle 12. In other examples, lifting device 22 may be located to pick up receptacles 14 from a side and/or a rear of service vehicle 12. In yet other examples, receptacles 14 may be manually lifted and dumped into bed 16.

As service vehicle 12 moves about environment 10, a satellite 28 or other tracking device may communicate with an onboard controller 30 (shown only in FIG. 2) to monitor the movements of service vehicle 12 and the associated changes made to environment 10 (e.g., pickup, dumping, placement, etc.). As will be explained in more detail below, onboard controller 30, or a separate audit controller 32 (e.g., an audit controller 32 located in a back office 34 or other service facility—shown only in FIG. 2), may then manage future operations of service vehicle 12 (and other similar service vehicles 12) based on these movements and changes.

Both of onboard and audit controllers 30, 32 may include means for monitoring, recording, storing, indexing, processing, communicating, and/or controlling other onboard and/or offboard devices. These means may include, for example, a memory, one or more data storage devices, a central processing unit, or any other components that may be used to run the disclosed application. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 2:
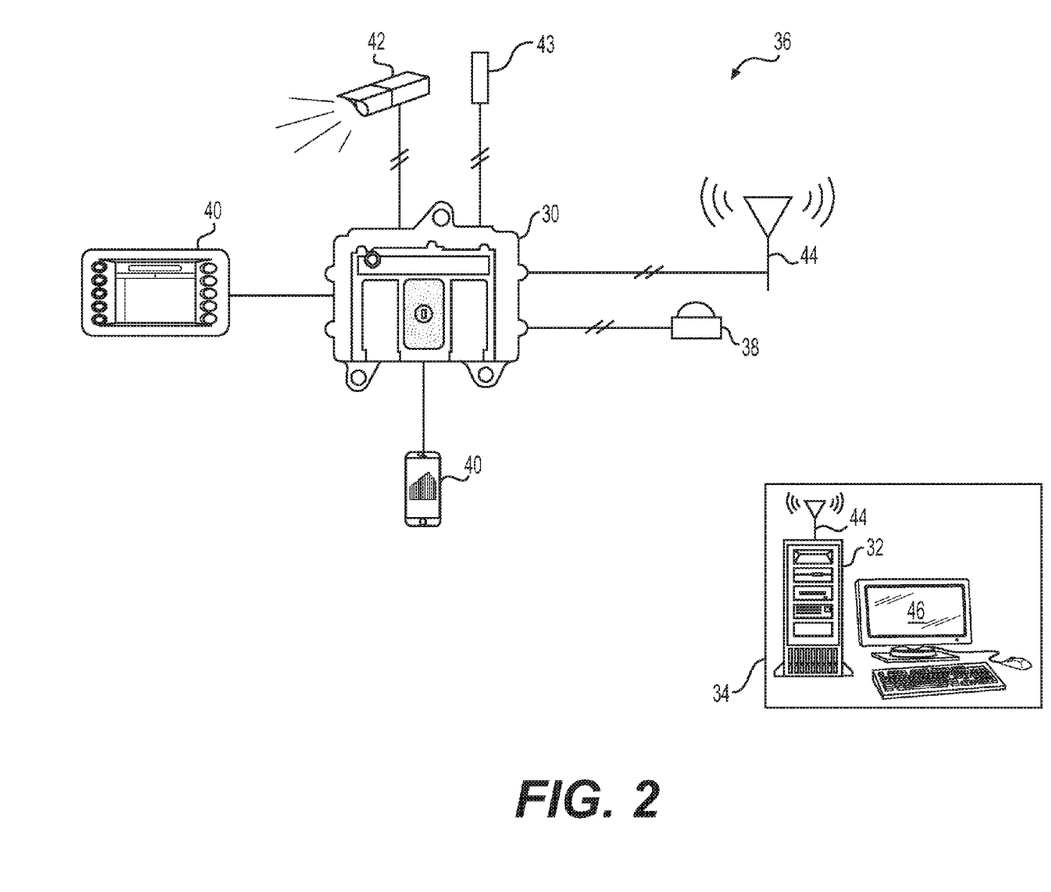
FIG. 2 is a diagrammatic illustration of an exemplary disclosed system that may be used to manage the environment of FIG. 1.

As shown in FIG. 2, onboard controller 30 may form a portion of a waste management system ("system") 36 that is configured to track, assist, and/or control movements of service vehicle 12 (shown only in FIG. 1). In addition to onboard controller 30, system 36 may also include a locating device 38, a manual input device 40, and at least one optical sensor (e.g., a camera) 42. In some embodiments, system 36 further includes one or more sensors 43. Sensor(s) 43 (and/or onboard controller 30) may be internal to manual input device 40, in some embodiments. Onboard controller 30 may be in communication with each of these other components and/or with audit controller 32 at back office 34 (e.g., via a communication device 44), and configured to determine, based on signals from these components and based on other known information stored in memory, the location of each service vehicle 12, characteristics and locations of receptacles 14 being moved by and/or in a vicinity of each service vehicle 12, and a mix of waste retrieved by service vehicle 12 during a service activity.

Locating device 38 may be configured to generate signals indicative of a geographical position and/or orientation of service vehicle 12 relative to a local reference point, a coordinate system associated with environment 10, a coordinate system associated with Earth, or any other type of 2-D or 3-D coordinate system. For example, locating device 38 may embody an electronic receiver configured to communicate with satellites 28 (referring to FIG. 1), or a local radio or laser transmitting system used to determine a relative geographical location of itself. Locating device 38 may receive and analyze high-frequency, low-power radio or laser signals from multiple locations to triangulate a relative 3-D geographical position and orientation. In some embodiments, locating device 38 may also be configured to determine a location and/or orientation of a particular part of service vehicle 12, for example of lift arms 24 (shown only in FIG. 1). Based on the signals generated by locating device 38 and based on known kinematics of service vehicle 12, onboard controller 30 may be able to determine in real time, the position, heading, travel speed, acceleration, and orientation of service vehicle 12 and lift arms 24. This information may then be used by onboard and/or audit controllers 30, 32 to update the locations and conditions of service vehicle(s) 12 and/or receptacles 14 in an electronic map or database of environment 10.

It is contemplated that locating device 38 may take another form, if desired. For example, locating device 38 could be an RFID reader configured to interact with an RFID tag located within environment 10 (e.g., at a customer location, on receptacle 14, etc.), or another type of scanner configured to read another type of indicia (e.g., a barcode) within environment 10. Based on the reading of the RFID tag or other indicia, the location and/or orientation of service vehicle 12 may be linked to the known location of the RFID tag or other indicia within environment 10.

Manual input device 40 may provide a way for an operator of service vehicle 12 to input information regarding observances made while traveling around environment 10. For example, the operator may be able to enter a type and/or condition of waste observed at a particular location, an amount of waste in or around receptacle 14, a fill status of a particular receptacle 14, a condition of receptacle 14, a location of receptacle 14, and/or other information about the receptacle and waste engaged by, loaded into, or otherwise processed by service vehicle 12. The information may be input in any number of ways, for example via a cab-mounted touch screen interface, via one or more buttons, via a keyboard, via speech recognition, via a mobile device (e.g., a smartphone or tablet) carried by the operator, or in another manner known in the art. In some embodiments, the operator may also be able to respond to inquiries received via input device 40, if desired. In addition to receiving manual input from an operator, input device 40 may also be capable of displaying information, for example the electronic map of environment 10, instructions from back office 34, scheduling, receptacle information (e.g., ID, configuration, location, weight, etc.), payload information (e.g., weight and/or volume), questions, waste audit information, etc.

In some embodiments, input device 40 may be configured to execute an application. For example, when input device 40 is a mobile device (for example a smartphone), the application can be a mobile app ("app"). The app can provide a graphical user interface (GUI) that displays information about a waste handling operation to an operator of service vehicle 12; and that receives input from the operator used to configure acquisition of operational data by optical sensor 42 and/or sensor(s) 43, to transmit the operational data to controllers 30, 32, to receive and display information about a current operation (e.g., as monitored by sensor(s) 43), etc.

Any number of optical sensors 42 may be mounted at any location suitable for capturing image data associated with the waste falling from receptacle 14 into bed 16 while lifting device 22 is in its upper-most and tilted position. In one example, optical sensor(s) 42 are mounted onboard vehicle 12 and positioned around a perimeter of an access opening in bed 16 (e.g., at a leading end, a trailing end, a side, etc.—see FIG. 1) and oriented toward a center of the access opening. In another example, optical sensor(s) 42 are mounted on receptacle 14 and positioned around a perimeter of an access opening into receptacle 14. In yet another example, optical sensor(s) 42 are mounted at a customer location, but not on vehicle 12 or receptacle 14. For example, optical sensor(s) 42 may be mounted to a fence, a wall, a roof, a light pole, or another structure at the customer location. In one embodiment, a single optical sensor 42 is used during waste auditing. In another embodiment, multiple optical sensors 42 are used to capture image data from different angles, to capture linked arrays of image data, to capture overlapping image data, to capture different types of image data, etc. (e.g., still images and video).

In the disclosed embodiment, optical sensor(s) 42 are modular, self-contained, and only temporarily mounted to bed 16 of vehicle 12. In this manner, optical sensor(s) 42 may be used only during performance of a waste audit associated with a first service vehicle 12, and periodically removed and remounted to a second service vehicle 12 for auditing of the waste received by the second service vehicle 12. In other embodiments, however, optical sensor(s) 42 are permanently connected to service vehicle 12. It is contemplated that, in some embodiments, one or more optical sensor(s) 42 may additionally or alternatively be connected to receptacle 14, such that the image data or additional image data may be captured from the perspective of receptacle 14 and used in the auditing process.

Each optical sensor 42 may be configured to capture digital image data that can be viewed in real or near-real time and/or downloaded for later viewing. For example, optical sensor 42 may be a still camera and/or a video camera configured to capture IR, ultraviolet, and/or full-spectrum images as digitized data. The digitized data may then be stored within an internal memory, communicated to onboard controller 30 (e.g., via Bluetooth), and/or communicated to audit controller 32 via wired or wireless technology. In some instances, the digitized data may be streamed via Bluetooth to controller 30, which may then store the data for later download and/or relay the data to audit controller 32 via communication device 44. As will be explained in more detail below, the image data may be shown on a display 46 at back office 34 and viewed by a human operator as part of the waste auditing process.

Sensor 43 may be any type of sensing and/or transducing device configured to monitor a parameter associated with the waste material being loaded into service vehicle 12 and/or the associated receptacles 14 being moved by service vehicle 12 (e.g., moved by lift arms 24), and to generate corresponding signals indicative thereof. Each of these sensors 43 may be located anywhere on or in service vehicle 12. In one example, sensor 43 may embody a lift sensor, such as any one or more of a load cell, a force gauge, a pressure sensor, a motion sensor, or another type of lift sensor associated directly with lift arms 24, with actuator(s) 26, with receptacle 14, and/or with a strut supporting bed 16. In this example, the signals generated by sensor 43 may correspond with strain on lift arms 24, with a force applied to lift arms 24 by actuator(s) 26, with a payload weight of bed 16, with a motion of receptacle 14, with a weight of waste contained inside receptacle 14, etc.

Alternatively, one or more sensors 43 may be associated with a power source or drivetrain of service vehicle 12, and configured to generate signals indicative of an amount of power used to propel service vehicle 12, to drive the hydraulics of actuators 26, to move the in-bed compactor, or to shut the associated door. Other types of sensors 43 (e.g., optical sensors such as spectrometers, IR sensors, RADAR sensors, LIDAR sensors, etc.) may also be utilized to determine characteristics load profile, volume, and/or shape) of the waste material inside receptacles 14 or of receptacles 14 themselves. In yet further examples, sensor 43 could be an acoustic sensor (e.g., one or more microphones), an accelerometer, or another similar type of sensor configured to detect engagement conditions and/or cycle completion of lift arms 24, an in-bed compactor, a receptacle door, etc. during lifting, dumping, and/or shaking of receptacle 14. Other types of sensors 43 (e.g., proximity sensors) may alternatively or additionally be utilized. Signals generated by these sensors 43 may be communicated to onboard and/or audit controllers 30, 32, and the appropriate controller may use the signals to determine conditions surrounding receptacles 14 (and/or the waste inside receptacles 14) before, during, and/or after servicing by service vehicle 12. As described above, any one or more of sensors(s) 43 may form an integral portion of input device 40 (e.g., the smartphone or tablet carried by the operator) or be a standalone component in wired or wireless communication with controllers 30, 32 and/or input device 40, as desired.

Onboard controller 30 may be configured to manage communications between other onboard components and audit controller 32 located at back office 34. For example, onboard controller 30 may receive signals from locating device 38, input device(s) 40, optical sensor(s) 42, and sensor(s) 43, and correlate the signals, filter the signals, buffer the signals, record the signals, or otherwise condition the signals before directing the signals offboard via communication device 44.

Communication device 44 may be configured to facilitate communication between onboard controller 30 and audit controller 32. Communication device 44 may include hardware and/or software that enable the sending and/or receiving of data messages through a communications link. The communications link may include satellite, cellular, infrared, radio, and any other type of wireless communications. Alternatively, the communications link may include electrical, optical, or any other type of wired communications, if desired. In one embodiment, onboard controller 30 may be omitted, and audit controller 32 may communicate directly with locating device 38, input device(s) 40, optical sensor(s) 42, and/or sensor(s) 43 via communication device 44, if desired. Other means of communication may also be possible.

Onboard and/or audit controllers 30, 32, based on the information received from onboard service vehicles 12 and also based on information received from other sources (e.g., from the Internet, from input at back office 34, etc.), can be configured to execute instructions stored on computer readable medium to perform methods of waste management at environment 10. For example, onboard and/or audit controllers 30, 32 may be configured to perform an audit of the waste retrieved by service vehicle 12 as the waste falls from receptacle 14 into bed 16. The audit may determine, at least in part, a mix of different types of materials (e.g., recyclables such as cardboard, plastic, glass, metal; biodegradables; hazardous materials; etc.). Determination of the mix may include, for example, an amount, a volume, a weight, a ratio, a value, a source, a destination, or another measure of one or more of the different types of material. In addition, onboard and/or audit controllers 30, 32 may be configured to provide recommendations based on the audit, such as how to reduce the waste, how to reduce a cost of the waste service, where to transport the waste, etc. An exemplary waste audit process 300 is illustrated in FIG. 3, and will be explained in more detail in the following section to further illustrate the disclosed concepts.

INDUSTRIAL APPLICABILITY

The disclosed system may be applicable to the waste service industry, where waste auditing can affect efficiency, profitability, and safety. The disclosed system may be able to facilitate and/or automatically perform remote auditing of waste as the waste is retrieved by a service vehicle 12. In addition, the disclosed system may be able to alert a customer regarding results of the waste auditing and/or provide recommendations based on the waste auditing such that the customer may alter internal processes to reduce waste service costs and/or volume. Further, the disclosed system may be able to adjust in real-time the schedule of a service vehicle 12 based on the results of the waste audit, such that the waste retrieved by the service vehicle 12 may be appropriately recycled or disposed of in a profitable manner. Operation of system 36 will now be described with reference to FIG. 3.

Figure 3:
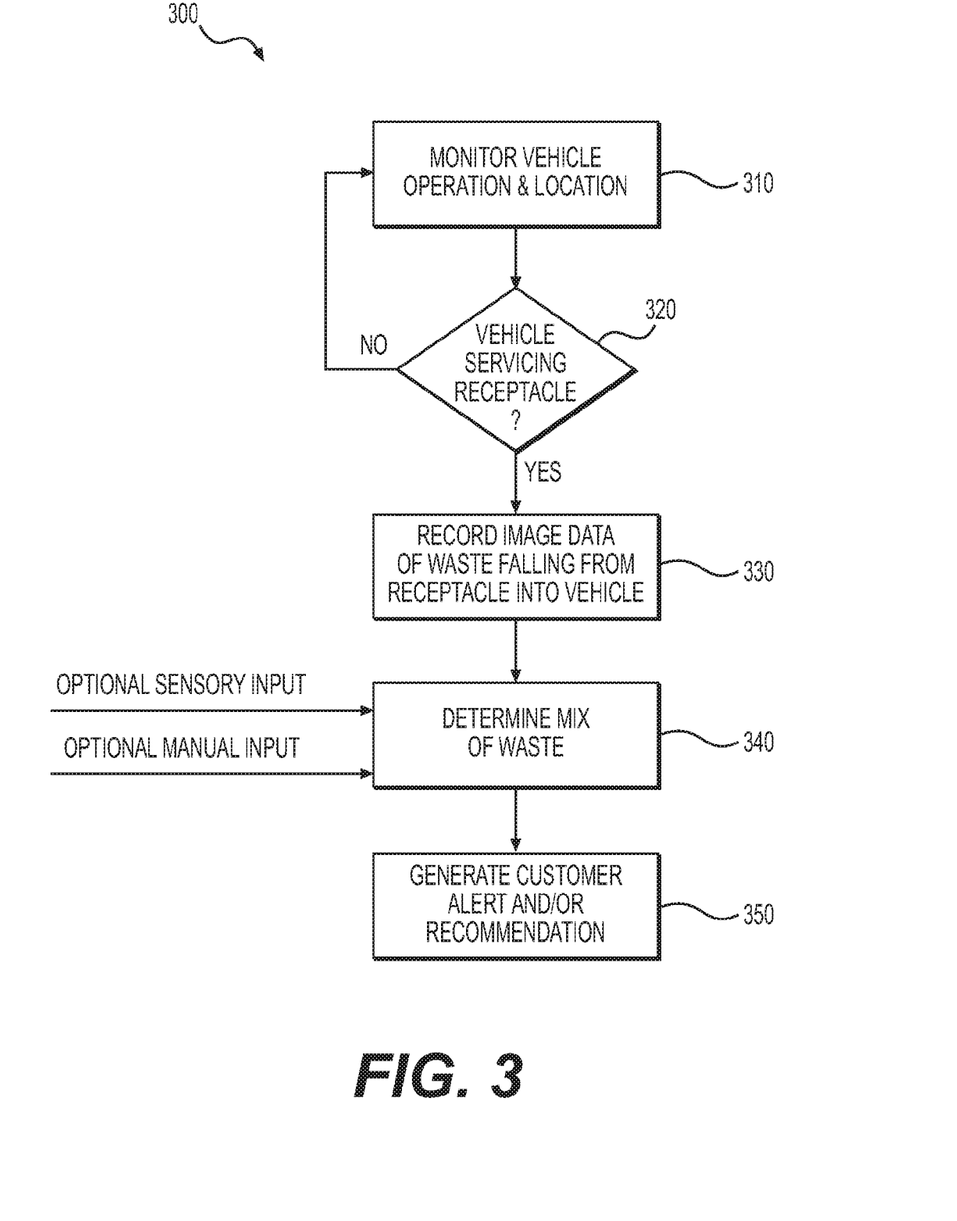
FIG. 3 is a flowchart depicting an exemplary disclosed method that may be performed by the system of FIG. 2.

As shown in FIG. 3, method 300 may begin with the monitoring of service vehicle operations and/or location (Step 310). In particular, as service vehicle 12 moves about environment 10 (referring to FIG. 1), the location of service vehicle 12 may be tracked via locating device 38 (referring to FIG. 2). In addition, in some embodiments, the operation (e.g., travel speed, lift arm motion, acoustics, barcode scanning, etc.) of service vehicle 12 may be monitored via sensor(s) 43. This information may be used (e.g., by onboard and/or audit controllers 30 and 32) to determine if service vehicle 12 is servicing (e.g., lifting, tilting, dumping, shaking, etc.) or about to service a receptacle 14 (Step 320). For example, monitored operational information may be compared to one or more thresholds (e.g., a location threshold, a speed threshold, a motion or force threshold, a vibration signature, a barcode index, etc.) to determine if a service activity associated with receptacle 14 has started or is about to start (if service vehicle has stopped at a receptacle location or if receptacle 14 has been identified, engaged, lifted, shaken, etc.). As long as receptacle servicing has not begun or is not about to begin, control may cycle through steps 310 and 320.

However, when it is determined that service vehicle 12 is beginning to service receptacle 14 (step 320:Y), data collection may be initiated (Step 330). The data collection may be automatically controlled (e.g., by onboard and/or audit controllers 30, 32 in response to the monitored operational information) and include, among other things, the collection of digitized image data from one or more of optical sensors 42. As described above, the image data may include still images and/or video of waste falling from receptacle 14 into bed 16 of service vehicle 12. By collecting the image data only when service vehicle 12 is servicing or is about to service receptacle 14, an amount of data captured by optical sensor(s) 42 and/or subsequently processed may be reduced. It is contemplated, however, that optical sensor(s) 42 could alternatively be continuously and/or manually operable (e.g., activated manually by an operator of service vehicle 12), if desired.

The image data collected by optical sensor(s) 42 may be communicated to audit controller 32 in any number of different ways. For example, the image data could be streamed in real or near-real time to onboard controller 30 (e.g., via Bluetooth), which may then relay the information to audit controller 32 (e.g., via communication device 44). Alternatively, optical sensor(s) 42 and/or onboard controller 30 may record the image data into memory for later download to audit controller 32. In yet another embodiment, optical sensor(s) 42 may communicate directly with audit controller 32.

Regardless of the way and timing in which the image data is communicated to audit controller 32, the image data may be used to determine a mix of the waste being retrieved by service vehicle 12 at a particular location and from a particular receptacle (Step 340). In the disclosed embodiment, controller 32 may automatically determine the mix of the waste based on machine learning and in association with programmed recognition patterns. In particular, audit controller 32 may be taught to recognize patterns of shapes, sizes, colors, frequencies, and/or orders of the waste material falling into bed 16 of service vehicle 12. For example, waste having a generally brown tone within a particular color spectrum and having a minimum area and/or generally rectangular shape may be determined to be corrugated cardboard. In another example, waste having a generally white tone, falling first from receptacle 14, and/or falling indirectly (e.g., floating) may be determined to be Styrofoam or another lightweight plastic. In yet another example, waste having a metallic tone, falling last from receptacle 14, and/or having a more direct trajectory may be determined to be metal or another heavy material.

In one exemplary embodiment, a particular customer may prepare some of the waste deposited inside receptacle 14 so as to be more easily recognized. In particular, the customer may place all waste of a particular type within a bag having a particular color or other identifying characteristic. For example, at a large retail location, all waste from a deli, produce, or garden area may be placed inside a green bag; all waste from restrooms may be placed inside a white bag, and all waste from an automotive center may be placed inside a black bag. In this example, audit controller 32 may then be programmed to detect the color-coding of the bags falling from receptacle 14, to count the number of bags of each color, to determine a volume of the bags, etc., and to therefrom determine the mix of waste falling from receptacle 14 into bed 16 of service vehicle 12.

In another embodiment, the determination made at step 340 may be at least partially affected by input received from one or more sensors 43. Specifically, signals generated by sensors 43 may be used to determine a change in weight of service vehicle 12 when service vehicle 12 is receiving waste from receptacle 14, a change in the vibrational signature, a change in lift arm force, or another change. These changes may then be indexed according to time, and linked to time-stamped images being captured by optical sensor(s) 42. In this manner, when a particular object (e.g., a large object) is seen falling from receptacle 14, an instantaneous change in vehicle weight (e.g., a large increase in weight) and/or receptacle weight (e.g. a large decrease in weight) may be associated with the object and used by audit controller 32 to determine if the object is plastic, metal, or something else.

In yet another embodiment, the determination made at step 340 may be at least partially affected by manual input. In particular, it may be possible for audit controller 32 to show on display 46 (referring to FIG. 2) the image data collected by optical sensor(s) 42, allowing a human operator to visually observe and make some or all of the determinations regarding identification of the waste mix. For example, controller 32 may make some determinations automatically and only receive input from the human operator when the automatic determinations are inconclusive or have a low confidence level. In another example, audit controller 32 and the human operator may both make all of the determinations, which may then be aggregated to produce a more accurate determination of the waste mix. In yet another embodiment, audit controller 32 may only show the image data to the human operator, who may then make all determinations regarding the waste mix. Other strategies may also be employed, in certain situations.

Once the mix of waste retrieved from a particular receptacle 14 has been determined, the customer may be alerted and/or provided with recommendations regarding the mix (Step 350). The alert may be in the form of a paper and/or electronic communication, and include text and graphics that illustrate a ratio, a volume, and/or a weight of each category of waste material recognized in the mix. The recommendation may include ways in which the customer may reduce waste flow (e.g., by removing cardboard that makes up a substantial portion of the waste, collecting biodegradables separately, etc.) and/or offset waste service costs (e.g., by recycling, by amassing particular materials before disposal or recycling, etc.). The alert and/or recommendation may be generated automatically by audit controller 32 for a particular customer (e.g., by linking signals from locating device 38 with the image data, corresponding mix determinations, and the customer identification) and/or manually.

In some embodiments, the operation of service vehicle 12 may be selectively adjusted based on the mix of waste determined at step 340. In particular, the schedule of service vehicle 12 may be adjusted in real-time based on the determination of waste mix just deposited into bed 16. For example, if it is determined that a large enough amount of the collected waste is recyclable, instead of dispatching service vehicle 12 to a landfill, it may make more sense financially to dispatch service vehicle 12 to a sorting and/or recycling center. This live scheduling adjustment may increase a profitability of the customer and/or the service provider, while simultaneously reducing a footprint on the environment.

It will be apparent to those skilled in the art that various modifications and variations can be made to the disclosed system. Other embodiments will be apparent to those skilled in the art from consideration of the specification and practice of the disclosed system. It is intended that the specification and examples be considered as exemplary only, with a true scope being indicated by the following claims and their equivalents.

What is claimed is:

1. A system for auditing waste retrieved by a service vehicle, comprising:
    an optical sensor configured to capture image data associated with waste as the waste falls into the service vehicle during completion of a waste service activity;
    at least one sensor configured to generate a signal indicative of a start of the waste service activity; and
    at least one controller in communication with the sensor and the optical sensor, the at least one controller being configured to:
        selectively activate the optical sensor based on the signal indicative of the start of the waste service activity;
        determine characteristics of a mix of the waste based on the image data, the mix of the waster including recyclable and non-recyclable waste;
        generate at least one of an alert and a recommendation regarding the mix of the waste based on the determination; and
        transmit instructions causing a scheduling adjustment based on the at least one of the alert or recommendation.

2. The system of claim 1, wherein the recommendation includes a recommendation to recycle or amass a portion of the waste based on the mix of the waste.

3. The system of claim 1, wherein the sensor is at least one of a location sensor, a lift sensor, an accelerometer, a pressure sensor, and an acoustic sensor.

4. The system of claim 1, wherein the sensor is associated with a power source or a drivetrain of the service vehicle, and wherein the signal is indicative of power used to perform a waste service activity.

5. The system of claim 1, further including a locating device configured to generate a location signal that is indicative of a location of the service vehicle, wherein the at least one controller is further configured to provide the at least one of the alert and the recommendation to a particular customer based on the location signal.

6. The system of claim 1, wherein the image data is video of the waste falling into the service vehicle.

7. The system of claim 1, wherein the at least one controller is configured to determine the mix of the waste in real time as the waste falls into the service vehicle.

8. The system of claim 7, wherein the optical sensor is modular and configured to be connected to the service vehicle periodically.

9. The system of claim 1, wherein the optical sensor is mountable onboard the service vehicle.

10. The system of claim 1, wherein:
    the at least one controller is configured to determine the mix of the waste based on machine learning.

11. The system of claim 10, wherein:
    the at least one controller is configured to determine the mix of the waste using machine learning based on programmed recognition patterns associated with the mix of the waste.

12. The system of claim 10, wherein patterns associated with the mix of the waste include at least one of patterns shape, size, color, frequency, and order.

13. The system of claim 1, wherein:
    the system further includes a display and an input device; and
    the at least one controller is further configured to:
        show the image data on the display; and
        receive input from a user via the input device indicative of visual observations of the waste made by the user when viewing the image data.

14. The system of claim 1, wherein:
    the at least one controller includes:
        an audit controller located remotely from the service vehicle; and
        an onboard controller in communication with the audit controller; and
    the optical sensor communicates with the onboard controller wirelessly.

15. The system of claim 14, further including a communication device configured to transmit the image data live from the onboard controller to the audit controller.

16. The system of claim 14, wherein the image data is stored within a memory of optical sensor or the onboard controller for later download to the audit controller.

17. The system of claim 1, wherein the at least one controller is further configured to selectively adjust a schedule of the service vehicle after retrieving the waste based on the mix of the waste.

18. A method for performing an audit of waste retrieved by a service vehicle, the method comprising:
    sensing a start of a waste service activity;
    capturing image data of waste as the waste falls into the service vehicle during completion of the waste service activity after the start of the waste service activity has been sensed;
    determining characteristics of a mix of the waste based on the image data, the mix of the waste including recyclable and non-recyclable waste;
    generating at least one of an alert and a recommendation regarding the mix of the waste based on the determination; and
    transmit instructions causing a scheduling adjustment based on the at least one of the alert or recommendation.

19. The method of claim 18, further including:
    showing the image data to a user;

receiving input from the users that is indicative of visual observations of the waste made by the user when viewing the image data.

20. A non-transitory computer readable medium containing computer-executable programming instructions for performing an audit of waste retrieved by a service vehicle, the instructions comprising:

sensing a start of waste service activity;

capturing image data of waste as the waste falls into the service vehicle during completion of a waste service activity after the start of the waste service activity has been sensed;

determining characteristics of a mix of the waste based on the image data, the mix of the waste including recyclable and non-recyclable waste;

generating at least one of an alert and a recommendation regarding a mix of the waste based on the determination; and transmitting instructions causing a scheduling adjustment based on the at least one of the alert or recommendation.

* * * * *